United States Patent
Corley

(10) Patent No.: US 9,981,723 B2
(45) Date of Patent: May 29, 2018

(54) TELESCOPING MONOPOD SYSTEM WITH DIRECTIONAL LIGHT SOURCE

(71) Applicant: Christian L. Corley, Olathe, KS (US)

(72) Inventor: Christian L. Corley, Olathe, KS (US)

( * ) Notice: Subject to any disclaimer, the term of this patent is extended or adjusted under 35 U.S.C. 154(b) by 34 days.

(21) Appl. No.: 15/184,721

(22) Filed: Jun. 16, 2016

(65) Prior Publication Data

US 2016/0288887 A1    Oct. 6, 2016

Related U.S. Application Data

(63) Continuation-in-part of application No. 14/986,455, filed on Dec. 31, 2015, which is a continuation-in-part of application No. 14/716,600, filed on May 19, 2015, which is a continuation-in-part
(Continued)

(51) Int. Cl.
| | |
|---|---|
| *B60L 1/00* | (2006.01) |
| *B63B 45/00* | (2006.01) |
| *F21V 21/22* | (2006.01) |
| *F21V 21/26* | (2006.01) |
| *H02J 7/02* | (2016.01) |
| *B63J 3/00* | (2006.01) |
| *H02J 50/10* | (2016.01) |
| *F21Y 101/02* | (2006.01) |

(Continued)

(52) U.S. Cl.
CPC ............. *B63B 45/00* (2013.01); *B63J 3/00* (2013.01); *F21V 21/22* (2013.01); *F21V 21/26* (2013.01); *H02J 7/0054* (2013.01); *H02J 7/025* (2013.01); *H02J 50/10* (2016.02); *F21Y 2101/02* (2013.01); *F21Y 2105/001* (2013.01); *H02J 7/0042* (2013.01)

(58) Field of Classification Search
CPC ...................................................... B62B 45/00
See application file for complete search history.

(56) References Cited

U.S. PATENT DOCUMENTS

| | | | |
|---|---|---|---|
| 1,351,817 A | 9/1920 | Walters | |
| 4,625,742 A | 12/1986 | Phillips | |
| 5,173,725 A | 12/1992 | Giles et al. | |

(Continued)

FOREIGN PATENT DOCUMENTS

DE     202005009976      9/2005

OTHER PUBLICATIONS

Bits and Pieces, "Hi-Tech LED Walking and Hiking Staff", http://www.bitsandpieces.com/product/hitech_led_walking_and_hiking_staff/multi_function_gadgets?p=0939377&utm_medium=shopping_engine&CAWELAID=120020260000000612&CAGPSPN=pla&gclid=Cj0KEQjwrPqnBRD56dGe1o_WIZsBEiQAb5ugt2el7XodvDsL5vXs0gubTxfJKo-OLP1nYD4nbK08, 2014.
excel-outdoors.com, "Power Plug", http://excel-outdoors.com/products/excel-outdoors-power-plug, 2015.
(Continued)

*Primary Examiner* — Daniel Puentes
(74) *Attorney, Agent, or Firm* — Law Office of Mark Brown, LLC; Christopher M. DeBacker

(57) ABSTRACT

A monopod for mounting to the boat seat mount of a marine vessel, such as a bass boat or speed boat, which is capable of providing power for mobile accessories via a second monopod affixed to the navigation light port of the boat. The monopod is extendable to heights up to or exceeding eight feet (8') above the deck of the boat, providing exceptional views for recording with a mounted camera while users participate in sports or other events within the boat. A release
(Continued)

mechanism allows one portion of the monopod to telescope away from a second portion, thereby extending the monopod.

6 Claims, 21 Drawing Sheets

Related U.S. Application Data of application No. 14/660,626, filed on Mar. 17, 2015, now Pat. No. 9,381,976.

(60) Provisional application No. 62/108,136, filed on Jan. 27, 2015, provisional application No. 62/107,704, filed on Jan. 26, 2015.

(51) Int. Cl.
  *F21Y 105/00* (2016.01)
  *H02J 7/00* (2006.01)

(56) References Cited

U.S. PATENT DOCUMENTS

| | | | |
|---|---|---|---|
| 5,331,990 | A | 7/1994 | Hall et al. |
| 5,588,735 | A | 12/1996 | Harada |
| 5,704,704 | A | 1/1998 | Reichard et al. |
| 5,973,618 | A | 10/1999 | Ellis |
| 6,244,759 | B1 | 6/2001 | Russo |
| 6,368,157 | B1 | 4/2002 | Bottazi et al. |
| 6,685,145 | B2 | 2/2004 | Mackay et al. |
| 6,855,003 | B1 | 2/2005 | Wyant |
| 7,017,598 | B2 | 3/2006 | Nipke |
| 7,442,351 | B2 | 9/2008 | Villani |
| D582,084 | S | 12/2008 | Gebhard et al. |
| 7,500,881 | B1 | 3/2009 | Lin |
| 7,862,197 | B2 | 1/2011 | Gebhard |
| 8,011,930 | B2 | 9/2011 | Lee et al. |
| 8,337,035 | B2 | 12/2012 | Lu |
| 8,547,056 | B2 | 10/2013 | Chang |
| 8,629,651 | B2 | 1/2014 | Guccione et al. |
| 8,754,609 | B2 | 7/2014 | Tsai et al. |
| 8,823,319 | B2 | 9/2014 | Van Novak, III et al. |
| 8,873,233 | B2 | 10/2014 | Reber et al. |
| 8,944,399 | B2 | 2/2015 | Sutherland et al. |
| 2004/0257822 | A1* | 12/2004 | Hopkins ............... A01K 75/02 362/477 |
| 2007/0279922 | A1 | 12/2007 | Villani |
| 2009/0255561 | A1 | 10/2009 | Brown |
| 2010/0130065 | A1 | 5/2010 | Teague |
| 2012/0013790 | A1 | 1/2012 | Chu |
| 2013/0278207 | A1 | 10/2013 | Yoo |
| 2014/0030929 | A1 | 1/2014 | Cracco |
| 2014/0210406 | A1 | 7/2014 | Na et al. |
| 2015/0002088 | A1 | 1/2015 | D'Agostino |
| 2015/0316837 | A1 | 11/2015 | Maltese |
| 2015/0344116 | A1 | 12/2015 | McLeroy |
| 2015/0346590 | A1 | 12/2015 | Lewis |
| 2015/0351531 | A1 | 12/2015 | Dalton |

OTHER PUBLICATIONS

Gander Mountain, "Goal Zero Switch 8 Power Source", http://www.gandermountain.com/modperl/product/details.cgi?pdesc=Goal-Zero-Switch-8-Power-Source&i=785207&r=view&cvsfa=2586&cvsfe=2&cvsfhu=373835323037&kpid=785207&gclid=Cj0KEQjwrPqnBRD56dGe1o_WIZsBEiQAb5ugtwROQCsK25-3KG-HoDs-32QpQu-N5XQcy4WFOLIA5B9QaAo_18P8, 2013.

gizmag.com, "The Slik-Stik nexgen high-tech walking stick", http://www.gizmag.com/the-slik-stik-nexgen-high-tech-walking-stick/11293/, Mar. 20, 2009.

Kayalu Gear, ""General Info about the Radpole Assembly"", http://www.kayalu.com/k/radpole-portable-ram-mounts-navigation-kayak-light-camera-mount-fishing-pole-mount_page_2.php, 2015, 1-3.

R & R Associates, "The New Generation Cane", http://www.rnrassociates.com/wordpress/the-new-generation-cane/, Mar. 7, 2013.

Seachoice Products, "2012 Marine Accessories Catalog", http://www.seachoice.com/products, 2012, 8.

* cited by examiner

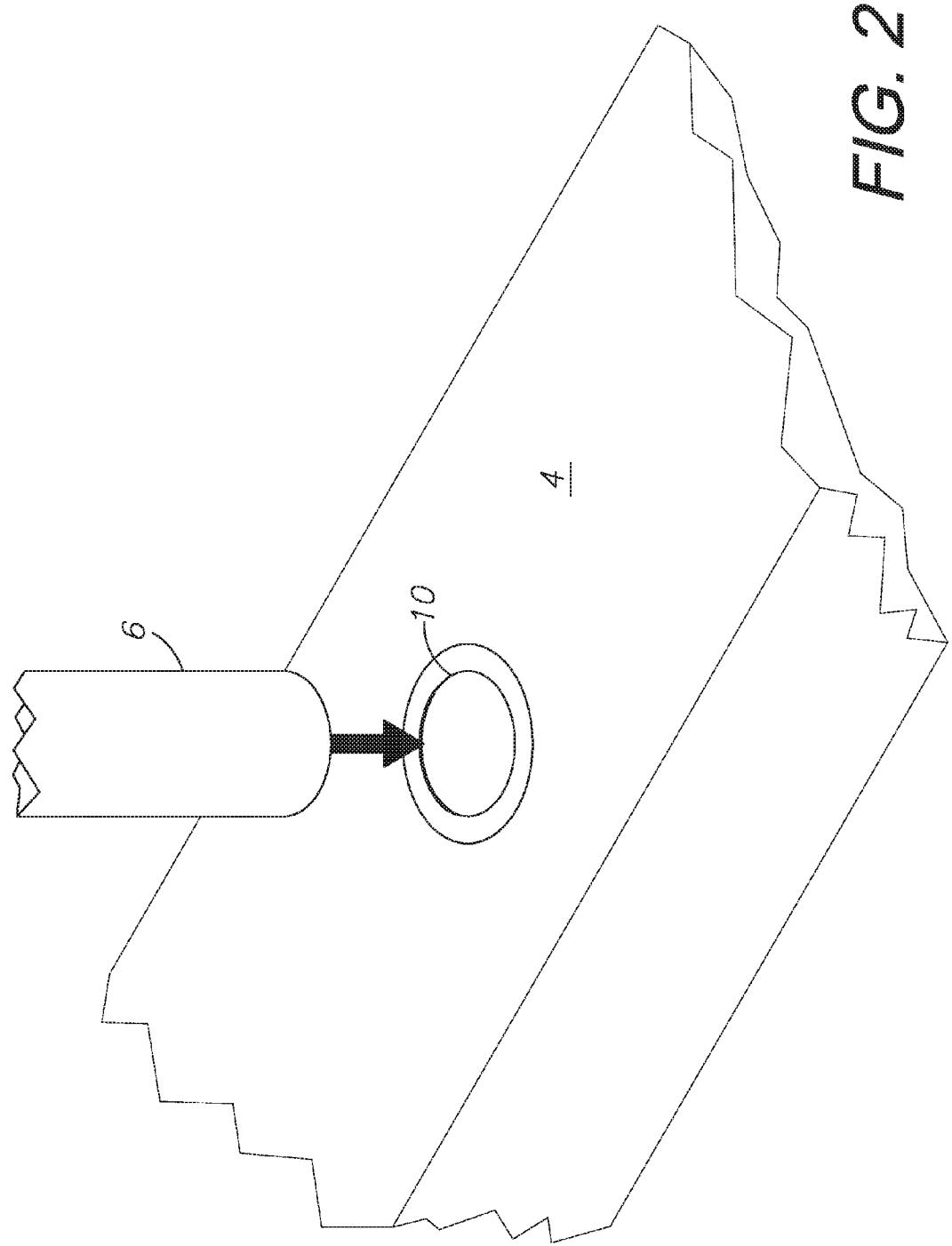

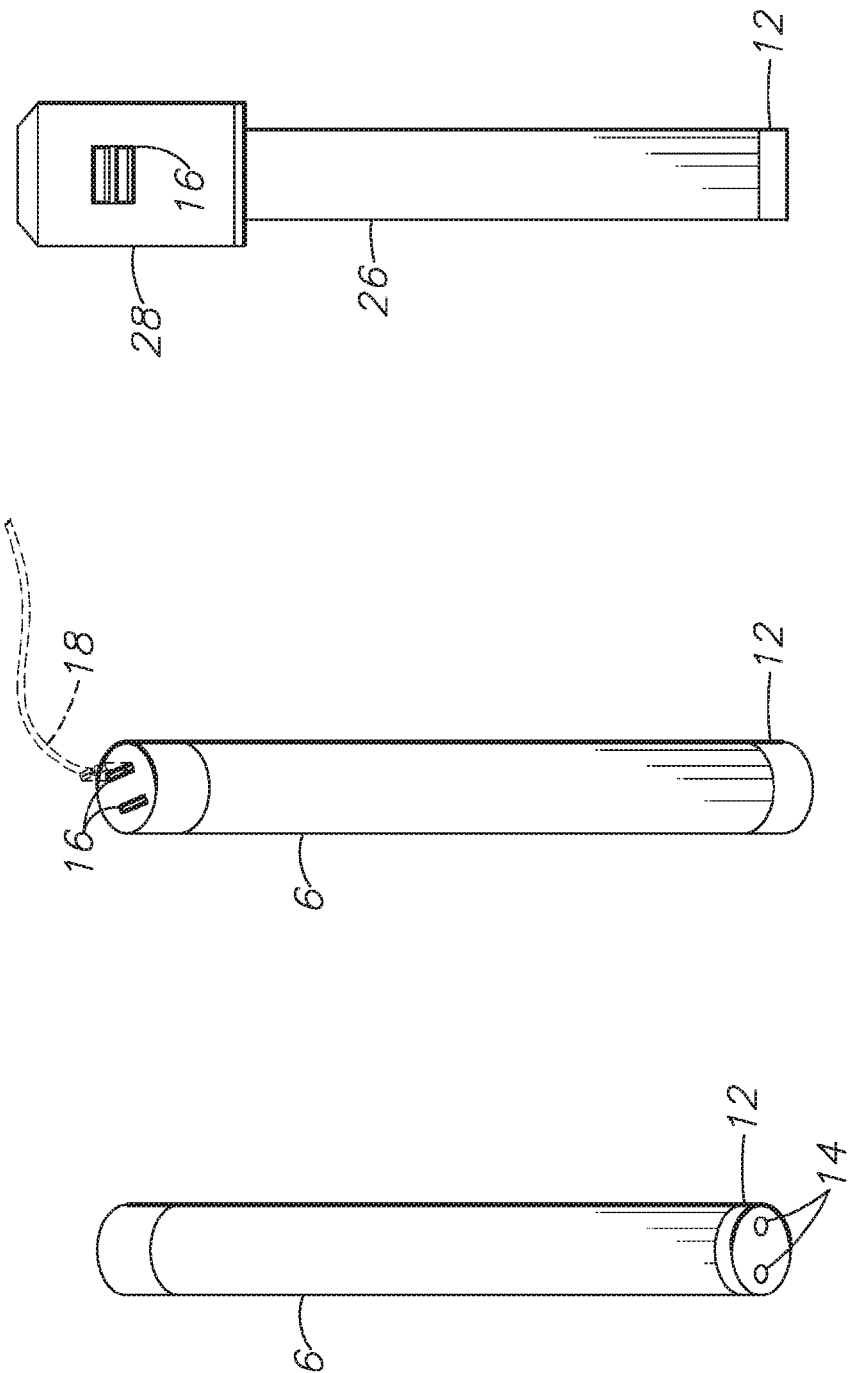

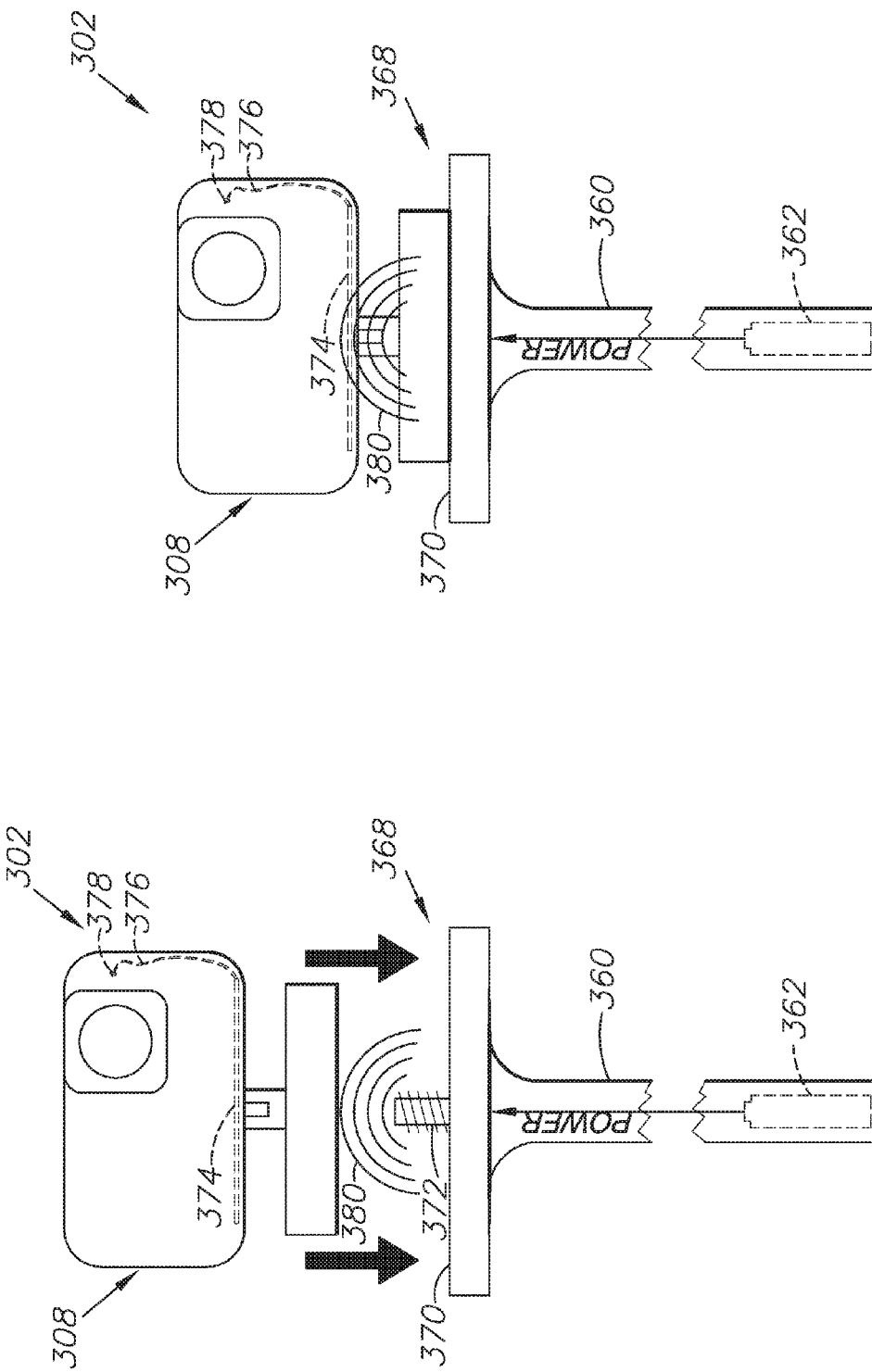

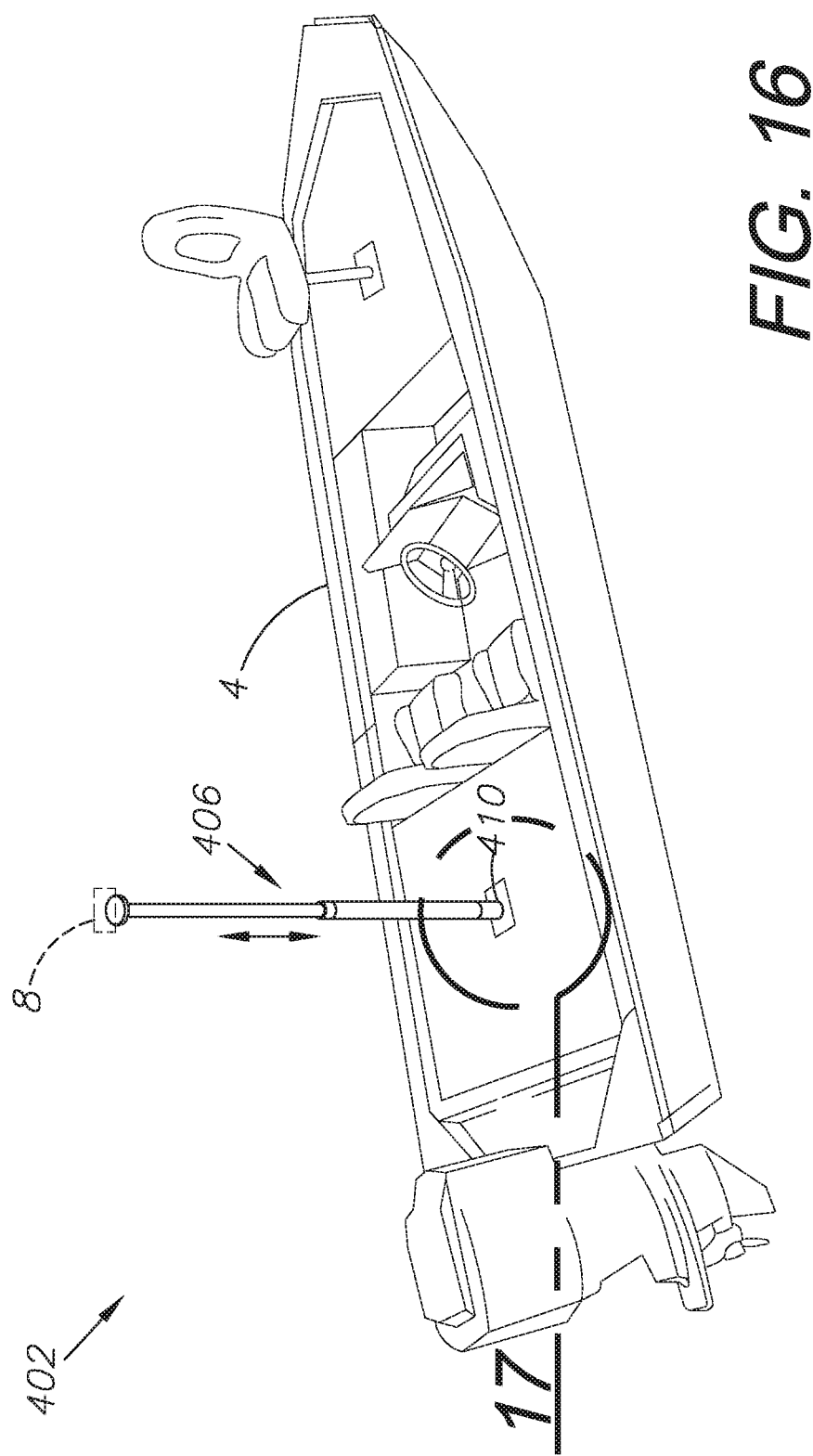

US 9,981,723 B2

TELESCOPING MONOPOD SYSTEM WITH DIRECTIONAL LIGHT SOURCE

CROSS-REFERENCE TO RELATED APPLICATIONS

This application is a continuation-in-part of and claims priority in U.S. patent application Ser. No. 14/986,455, filed Dec. 31, 2015, which is a continuation-in-part of and claims priority in U.S. patent application Ser. No. 14/716,600, filed May 19, 2015, which is a continuation-in-part of and claims priority in U.S. patent application Ser. No. 14/660,626, filed Mar. 17, 2015, which claims priority in U.S. Provisional Patent Application No. 62/108,136, filed Jan. 27, 2015, and also claims priority in U.S. Provisional Patent Application No. 62/107,704, filed Jan. 26, 2015, all of which are incorporated herein by reference.

BACKGROUND OF THE INVENTION

1. Field of the Invention

The present invention relates generally to a monopod marine vessel accessory, and more specifically to a monopod which connects with the navigation light socket port(s) of a marine vessel and may provide power to mobile accessories.

2. Description of the Related Art

Many boating enthusiasts, from professional bass fisherman such as Casey Scanlon, to extreme water sport performers, desire to record their sporting feats using cameras such as GoPro® cameras manufactured by GoPro, Inc. of San Mateo, Calif. and other action cameras, including but not limited to the Garmin Virb®, manufactured by Garmin Ltd. of Olathe, Kans., and the iON™ action camera, manufactured by iON America, LLC of Moorestown, N.J. Other more casual boating enthusiasts, such as Roger Corley, may wish to similarly record family activities, charge mobile computing devices, or otherwise provide power to accessories or method of attachment for accessories while on a marine vessel.

Presently there are capabilities of providing power to mobile accessories using 12V ports (a.k.a. cigarette lighters). However, many boats, and certainly most older boats, lack such a power port. Similarly, when that power port exists in a boat, it typically is located near the steering column and not near the rear and/or front of the boat where activity generally occurs.

What is needed is a power solution for mobile devices, including smart phones, cameras, and other electronic devices consumers may want aboard, which is compatible for mounting non-electronic accessories also, and further which is compatible with virtually all marine vessels, which offers flexibility and versatility for multiple water sports and activities.

Heretofore there has not been available a monopod for marine vessels with the advantages and features of the present invention.

SUMMARY OF THE INVENTION

The present invention generally provides a monopod for mounting to the navigation light power port of a marine vessel, such as a bass boat or speed boat, which provides power for mobile accessories, such as cameras and smart phones. The monopod may be fitted with extendable, bendable arms for mounting additional cameras or other electronic devices or for providing additional accessories.

BRIEF DESCRIPTION OF THE DRAWINGS

The drawings constitute a part of this specification and include exemplary embodiments of the present invention illustrating various objects and features thereof.

FIG. 2 is a detailed isometric view thereof, taken about the circle on FIG. 1.

FIG. 3A is an isometric view from the base of an embodiment of the present invention.

FIG. 3B is an isometric view from the top thereof.

FIG. 4 is a front elevational view of an alternative embodiment thereof.

FIG. 15A is a diagrammatic elevational view thereof, showing two elements being connected.

FIG. 15B is a diagrammatic elevational view thereof, wherein the two elements of FIG. 15A are connected.

FIG. 16 is an isometric view of another alternative embodiment of the present invention located in a typical environment in which it may be deployed, herein depicted as a bass fishing boat.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate.

Additional examples including a mobile smart device including a display device for viewing a typical web browser or user interface will be commonly referred to throughout the following description. The type of device, computer, display, or user interface may vary when practicing an embodiment of the present invention. Said terminology will include the words specifically mentioned, derivatives thereof and words of similar meaning.

Power providing inputs in the embodiment of the invention may encompass any format of Uniform Serial Bus (USB) input, 12V input, or any other type of power adapter. However, the embodiment of the present invention is intended only to be inserted into the navigation light port located on a marine vessel. The marine vessel applies to any type of boat, ship, or any other waterborne vessel which encompasses a navigation light port. A standard navigation light port is considered to be a port on a marine vessel which is required by the International Regulations for Preventing Collisions at Sea.

II. Preferred Embodiment Marine Monopod System 2

Figure 1:
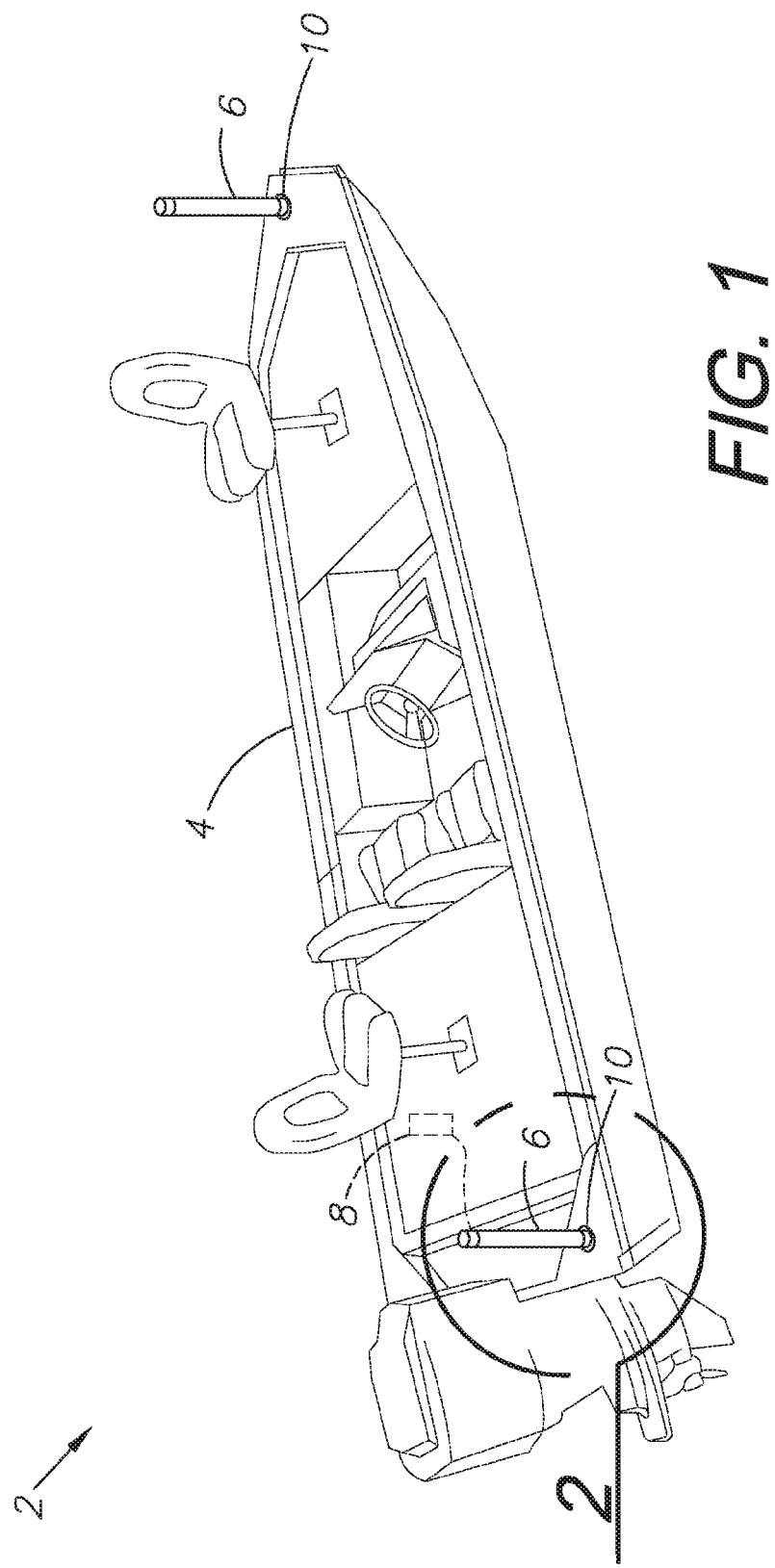
FIG. 1 is an isometric view of an embodiment of the present invention located in a typical environment in which it may be deployed, herein depicted as a bass fishing boat.

Referring to the figures in more detail, FIG. 1 shows a marine vessel 4 employing a marine monopod system 2. The monopod system 2 includes a monopod 6 which is inserted into a navigation light power port 10 and draws power from the port for electronic devices 8, such as smart phones, cameras, global positioning system (GPS) devices, and other mobile electronic devices. Note that a second navigation light power port 10 is located at the front of the vessel 4, which may accommodate a second monopod 6. Other ports may be located in other locations around the vessel.

FIG. 2 shows a closer view of the monopod 6 being inserted into the power port 10. FIGS. 3A and 3B show more detail of the monopod 6. This embodiment includes a monopod base 12 with contacts 14 for drawing power from the power port 10. A pair of Universal Serial Bus (USB) ports 16 are shown on the top portion of the monopod. Cables 18 for charging mobile devices may be inserted into these ports, and power is drawn from the power port 10. Other types of power adapters, such as 12V adapters, may be used instead of USB ports.

FIG. 4 shows an alternative embodiment monopod 26 which includes a head portion 28 with the USB ports 16 mounted on one or more sides of the head portion.

III. Alternative Embodiment Marine Monopod System 52

Figure 5:
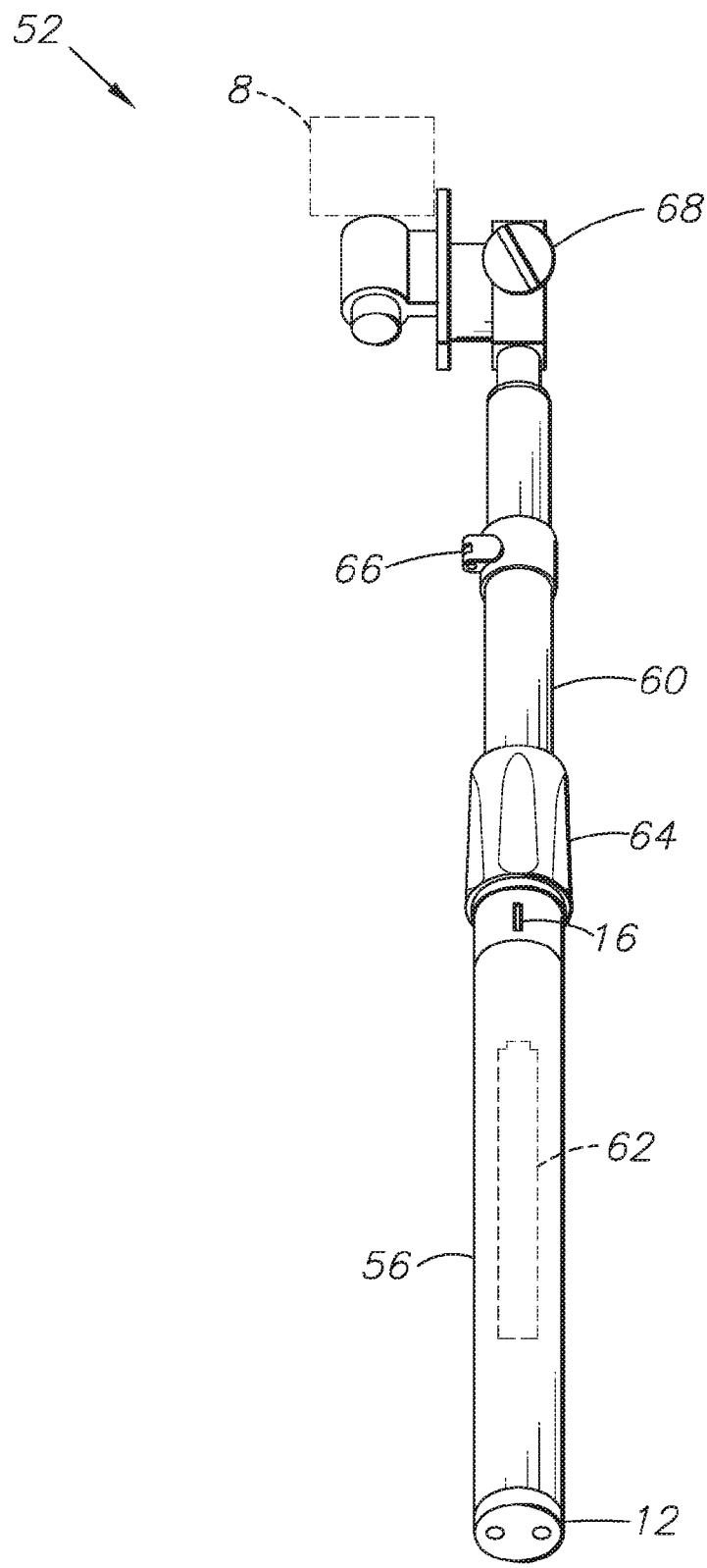
FIG. 5 is an isometric view of another embodiment of the present invention.

FIG. 5 shows an alternative marine monopod system 52 which uses a base monopod 56 with a telescoping arm 60 capable of extending a few inches or several feet above or away from the marine vessel. The monopod 56 includes the same base 12 for connecting with the navigation light port 10 and at least one USB port 16 for powering an accessory 8. Here, it is likely that the accessory is a camera for capturing video images, but the accessory could be any electronic device.

The telescoping arm 60 may be connected to the base monopod 56 with an adjustable handle 64 which tightens or loosens to allow telescoping of the arm 60. Other means may be employed which allow the arm to telescope. A second telescoping motion may be employed by releasing a locking device 66 at a second point along the arm 60. This locking device as shown can be quickly unlocked or locked using one finger.

The base monopod 56 may include a rechargeable battery 62, allowing the monopod to power or charge a device 8 even when it is not inserted into the navigational light port 10. An accessory mount 68, such as the screw-based camera mount shown here, may be connected to the top of the telescoping arm 60.

IV. Alternative Embodiment Monopod System 102

Figure 6:
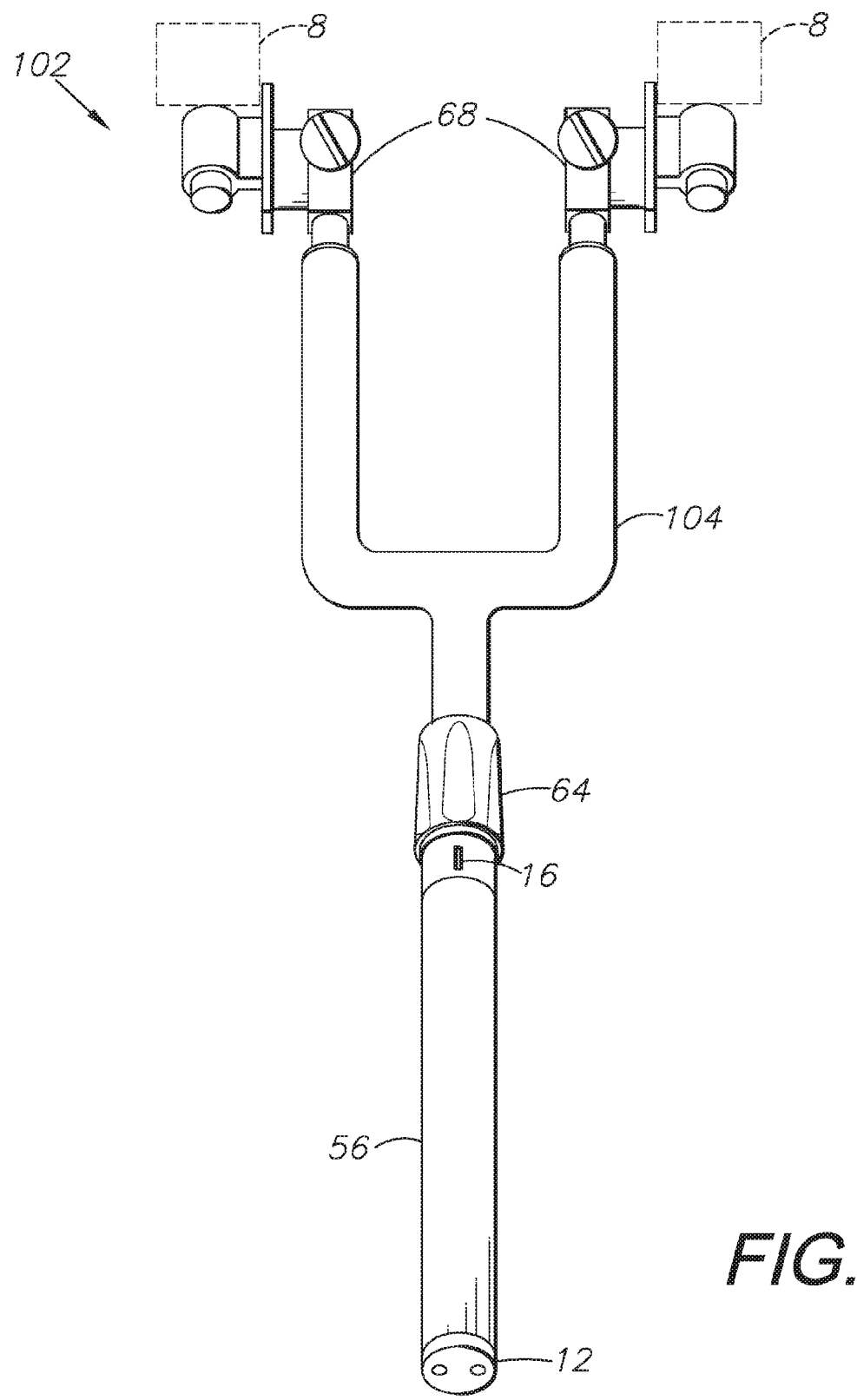
FIG. 6 is an isometric view of yet another embodiment of the present invention.

FIG. 6 employs many of the same features as the system 52 described above, but instead of the telescoping arm 60 of system 52, this system employs a forked arm 104 which is connected to the base monopod 56, and which allows for two devices to be connected to the same monopod system 102. In this way, one camera could face forward while the other faces away. Alternatively, two devices could charge simultaneously while being used.

V. Alternative Embodiment Monopod System 152

Figure 7:
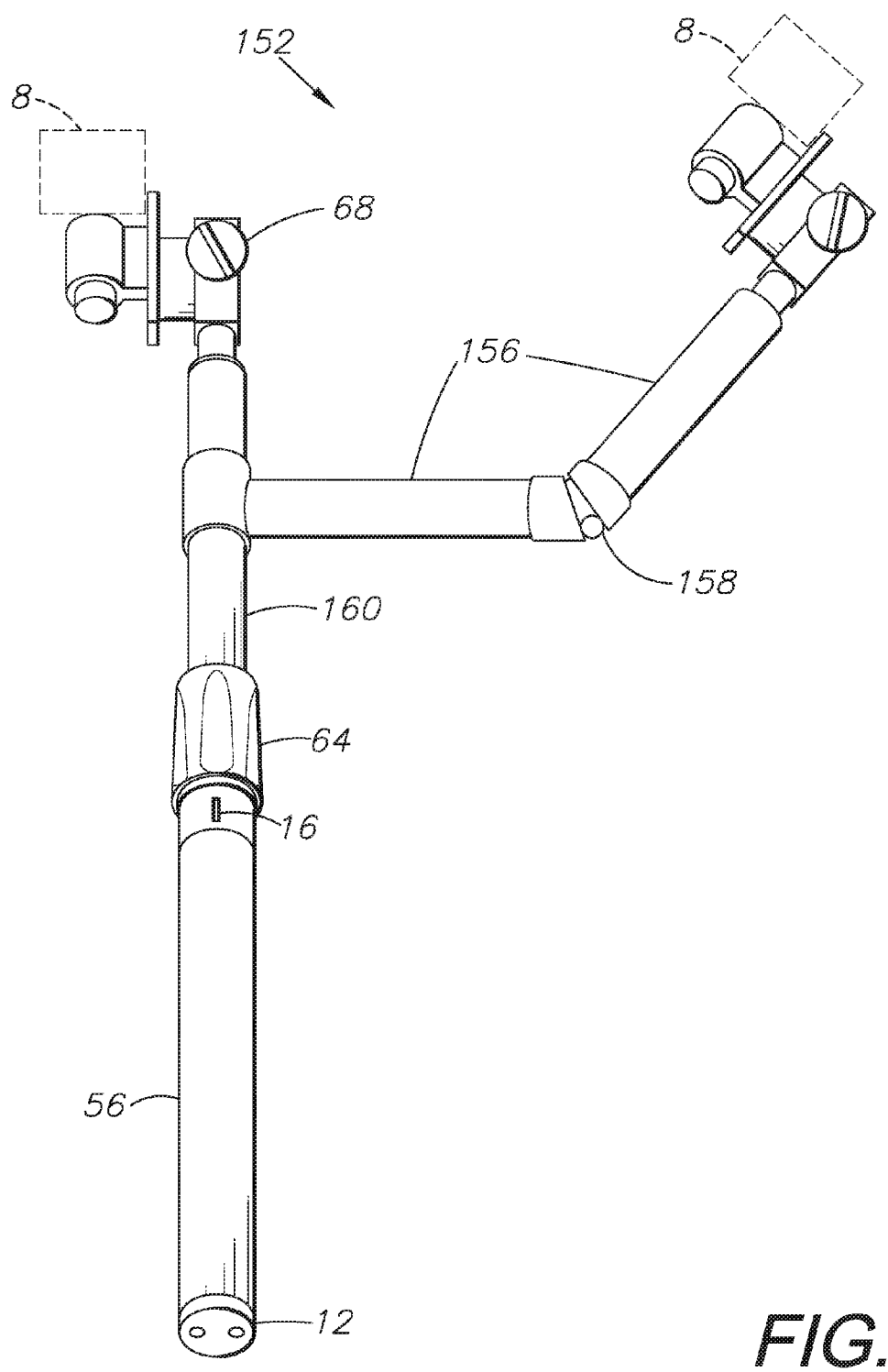
FIG. 7 is an isometric view of yet another embodiment of the present invention.

FIG. 7 shows an alternative embodiment monopod system 152 which uses the same base monopod 56 setup as systems 52 and 102, but which includes a telescoping arm 160 which allows an extension arm 156 to connect to the telescoping arm 160, either using a clip, a connecting ring, or some other connecting device. The extension arm 156 may culminate at an elbow 158, which may connect to a second extension arm 156 as shown. This type of connection could occur several times. It is important that the elbow 158 contain significant resistance against being bent such that the arms 156 retain any angle they are set at. This allows for dynamic camera angles using cameras as the electrical accessories. For example, in a boat, the extension arm 156 could place a camera close to the water as the boat moves through the water, while the other camera is placed far above the boat. The two cameras would capture video simultaneously.

Additional extension arms may be placed for two, three, four, or more camera angles.

Figure 8:
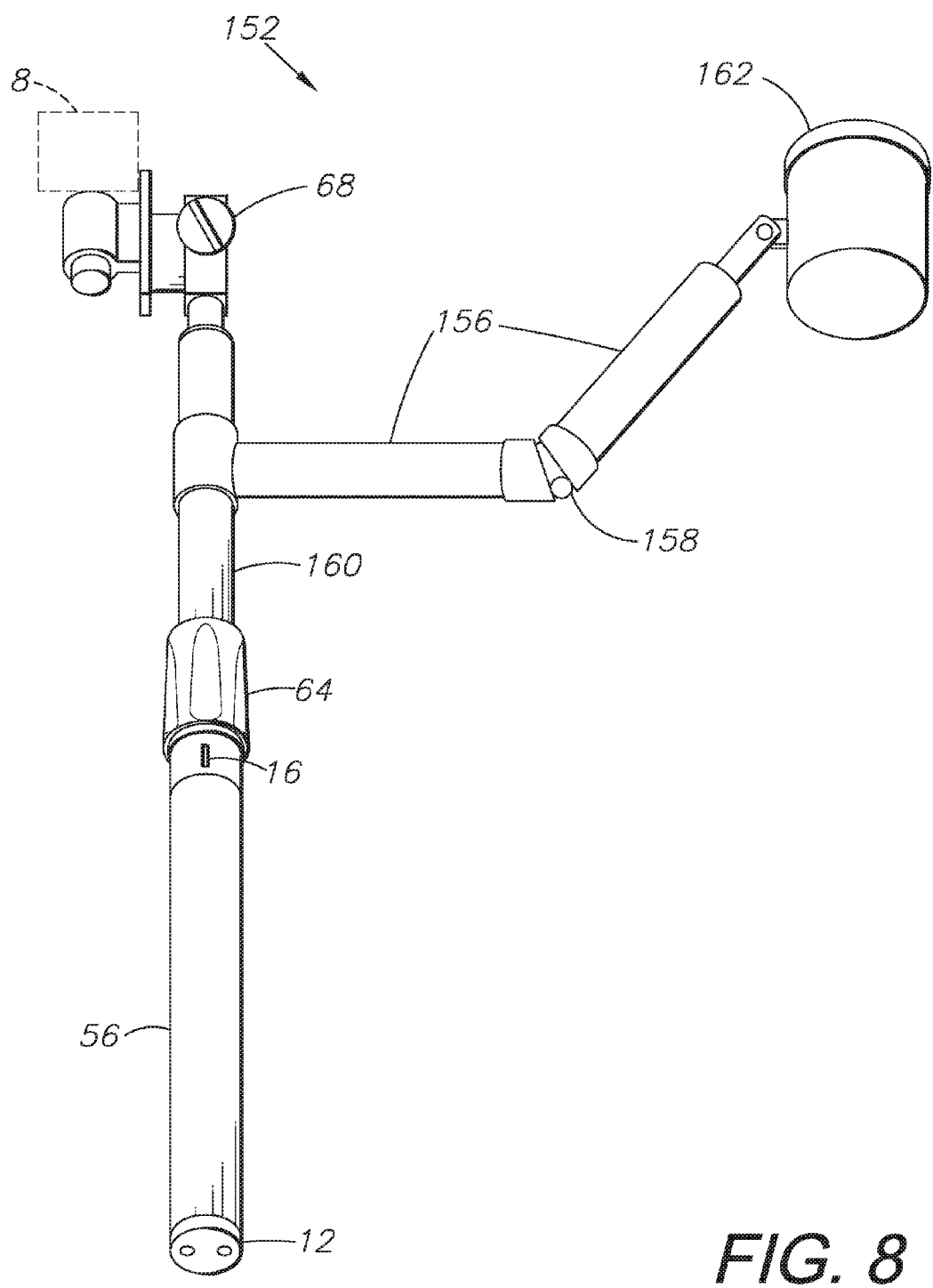
FIG. 8 is an alternative isometric view thereof, showing a cup holder accessory.
Figure 9:
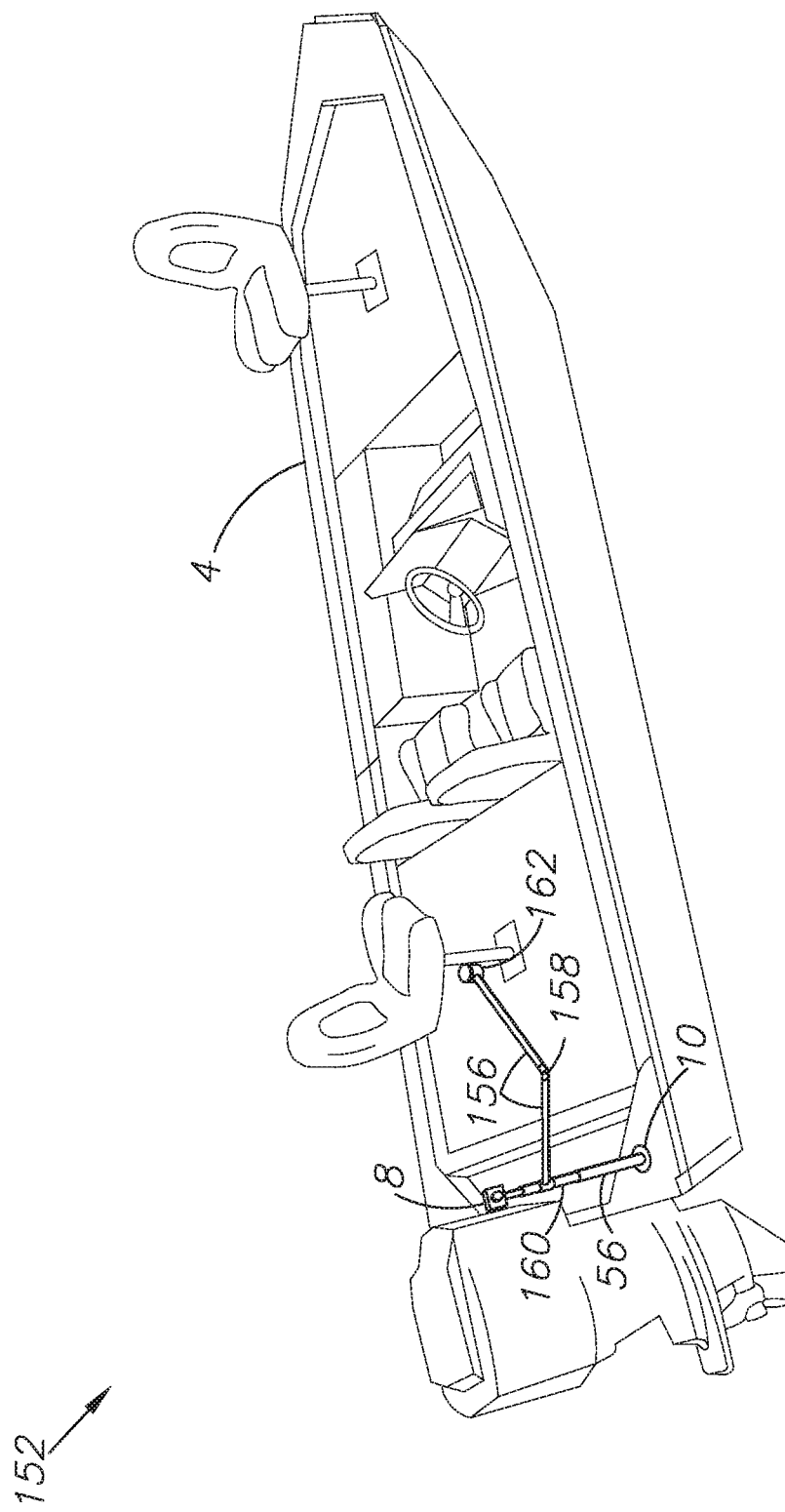
FIG. 9 is an isometric view of the embodiment of FIG. 8 located in a typical environment in which it may be deployed, herein depicted as a bass fishing boat.

Alternatively, as shown in FIG. 8, the accessory may instead be a cup holder 162. It is common for bass fishing boats or older boats to lack sufficient space to store drinks, especially when a fisherman is in the fishing seat. FIG. 9 shows how the arm can be positioned to provide a cup holder to the fisherman while a camera is still filming from atop the telescoping arm 160.

VI. Alternative Embodiment Monopod System 202

Figure 10B:
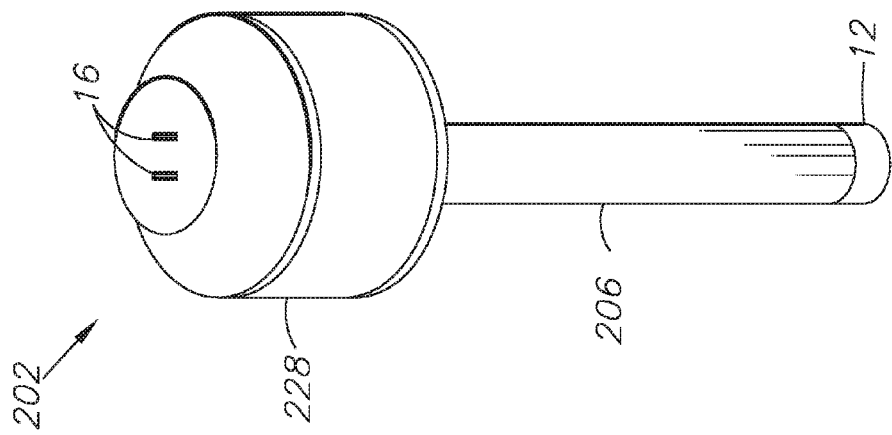
FIG. 10B is an isometric view from the top thereof.
Figure 10A:
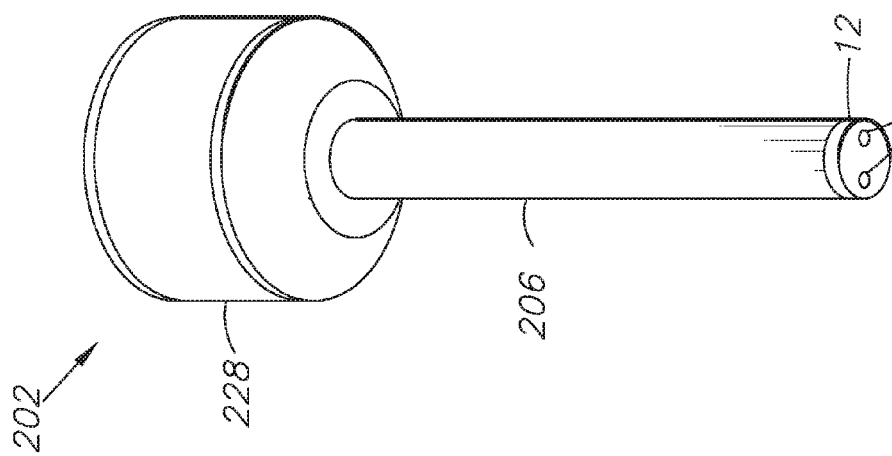
FIG. 10A is an isometric view from the base of yet another alternative embodiment of the present invention.

FIGS. 10A and 10B employ a monopod 206 which includes a basic navigational lamp 228 atop the monopod 206. As shown, two USB ports 16 are located atop the lamp. However, the USB ports could be placed along the sides of the monopod 206, and an accessory mount, such as those shown in FIGS. 5-8 above, may be placed atop the lamp. This would allow for a camera to be mounted to the navigational lamp and filming to take place even while the navigational light is in use or at night.

It should be noted that any and all commercial electronic devices could benefit from the present invention. GPS devices, fish finders, and tablet computers would be at the fisherman's fingertips using one or more of the embodiments of the present invention without the fisherman leaving the fishing chair.

VII. Wireless Power Source Monopod System 302

Figure 11:
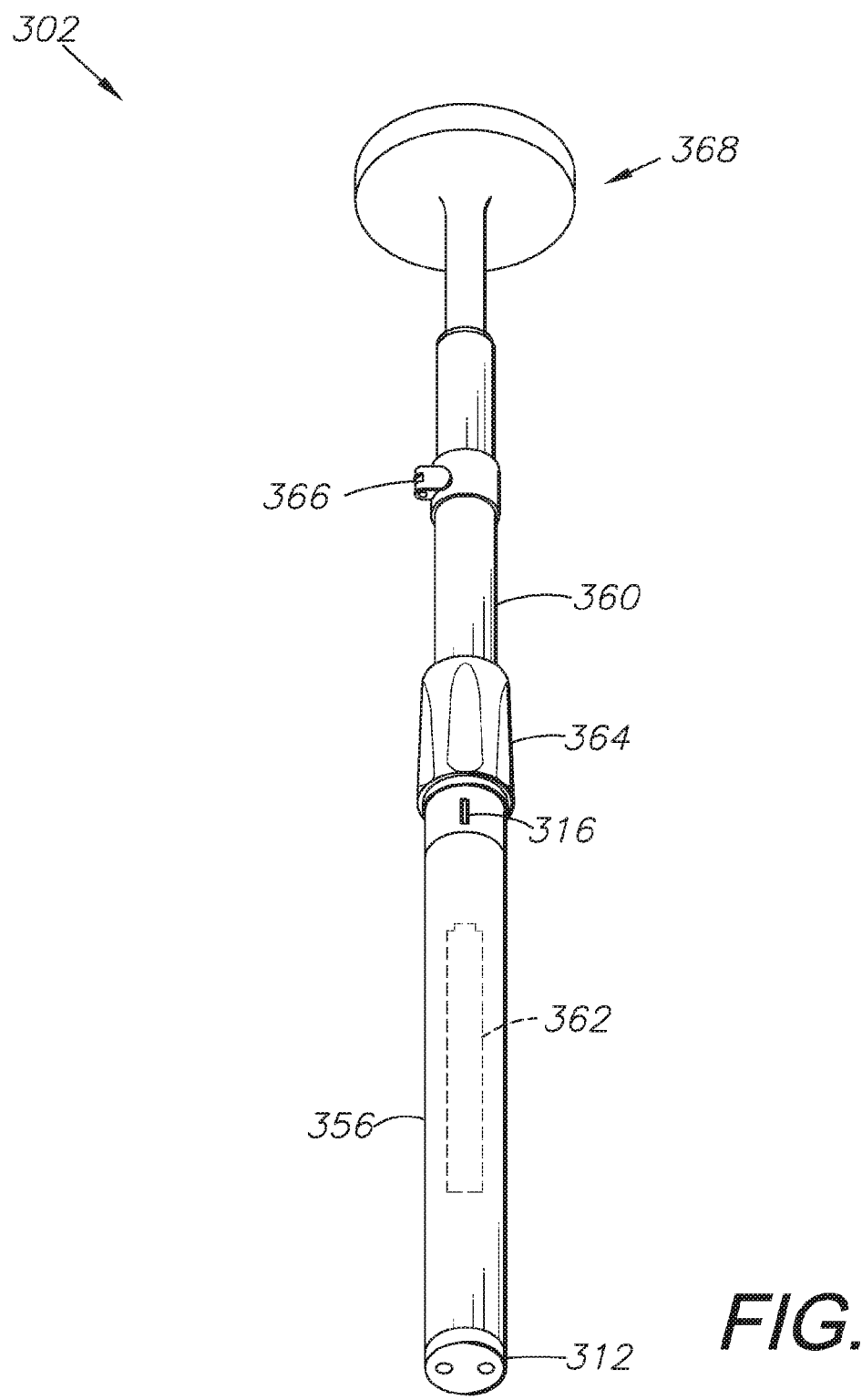
FIG. 11 is a bottom-up isometric view of an alternative embodiment of the present invention.
Figure 12:
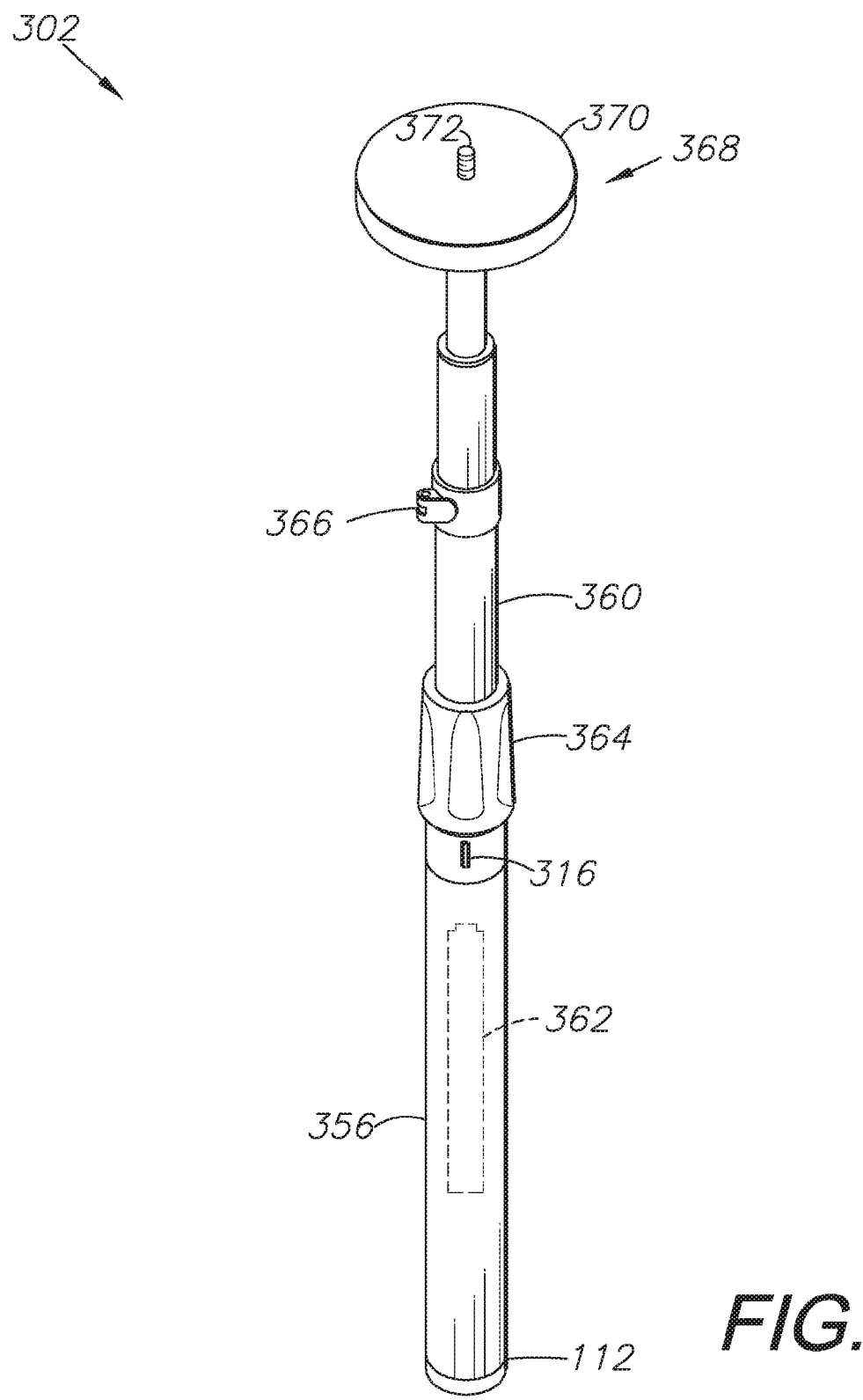
FIG. 12 is a top-down isometric view thereof.

FIGS. 11-15B show another alternative embodiment system which includes wireless power for powering an electrical accessory, such as a camera as discussed above. As shown in FIGS. 11-12, a monopod 356 having a telescoping arm 360 includes a battery power source 362, a charging port 312 which may or may not interface with a navigation light port of a watercraft, and locking elements 366 for locking the telescoping arm 360 at various lengths. The monopod may or may not include a USB port 316 or other port for charging of electrical accessories. A preferred embodiment may include an adjustable handle 364 for extending and retracting the telescoping arm 360.

This embodiment also includes a wireless power delivery system 368 connected to the end of the telescoping arm 360. The primary features of this delivery system 368 are shown in FIG. 12 and include a base 370 and a mounting screw 372, such as typically used to mount cameras or camera cases to monopods or tripods.

Figure 14:
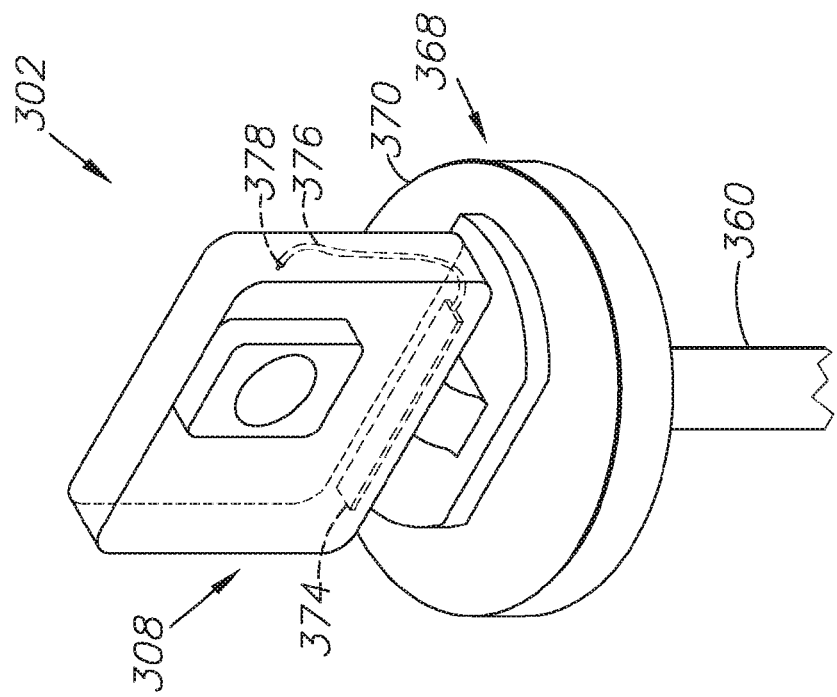
FIG. 14 is an isometric view indicating the connection of elements thereof.
Figure 13:
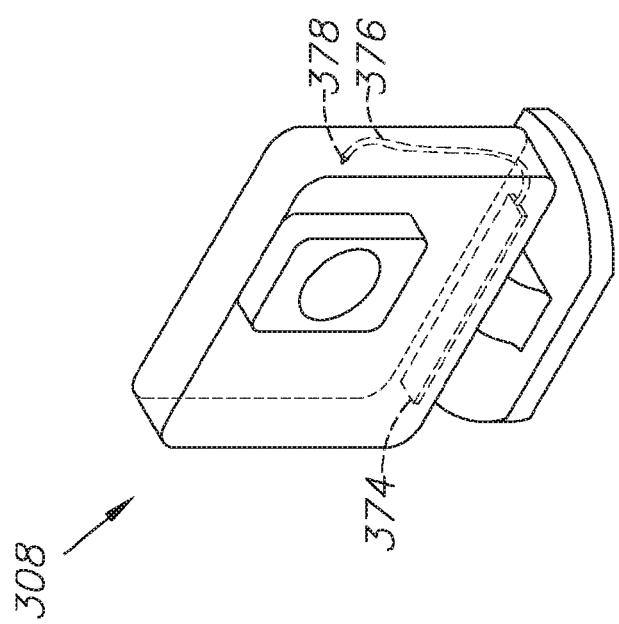
FIG. 13 is an isometric view of elements thereof.
Figure 17:
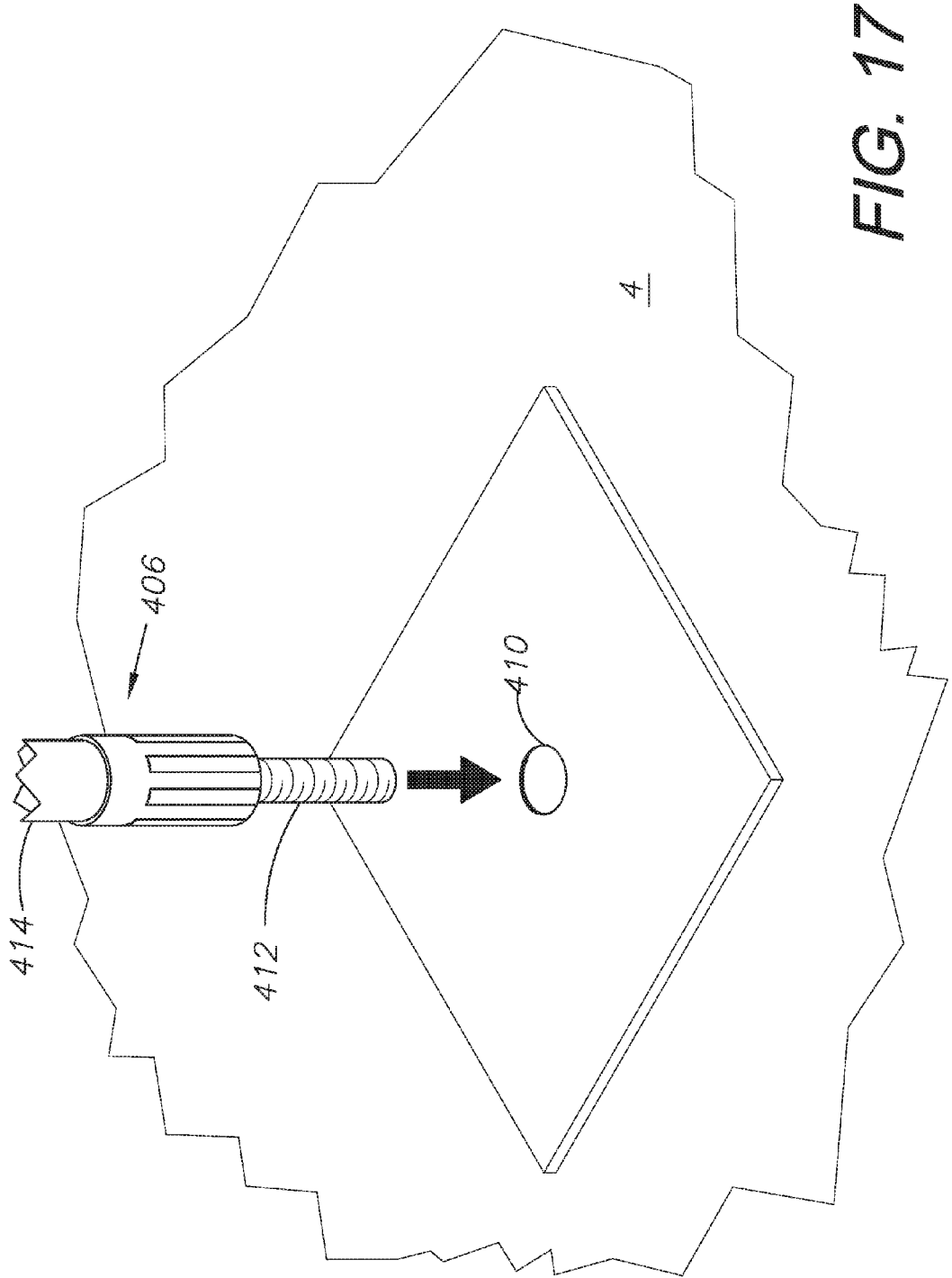
FIG. 17 is a detailed isometric view thereof, taken about the circle on FIG. 16.
Figure 18:
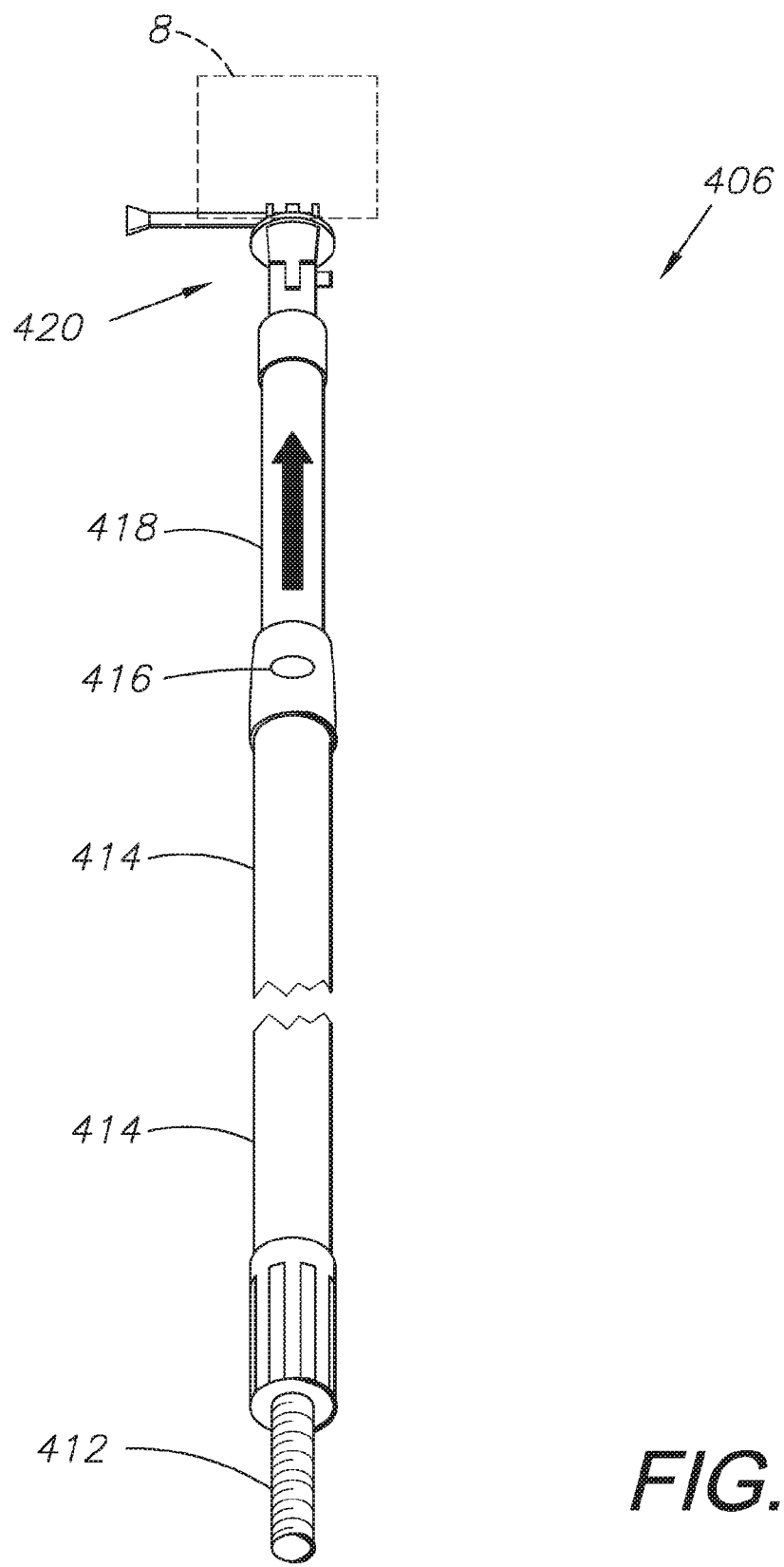
FIG. 18 is an isometric view from the base of the alternative embodiment thereof.
Figure 19:
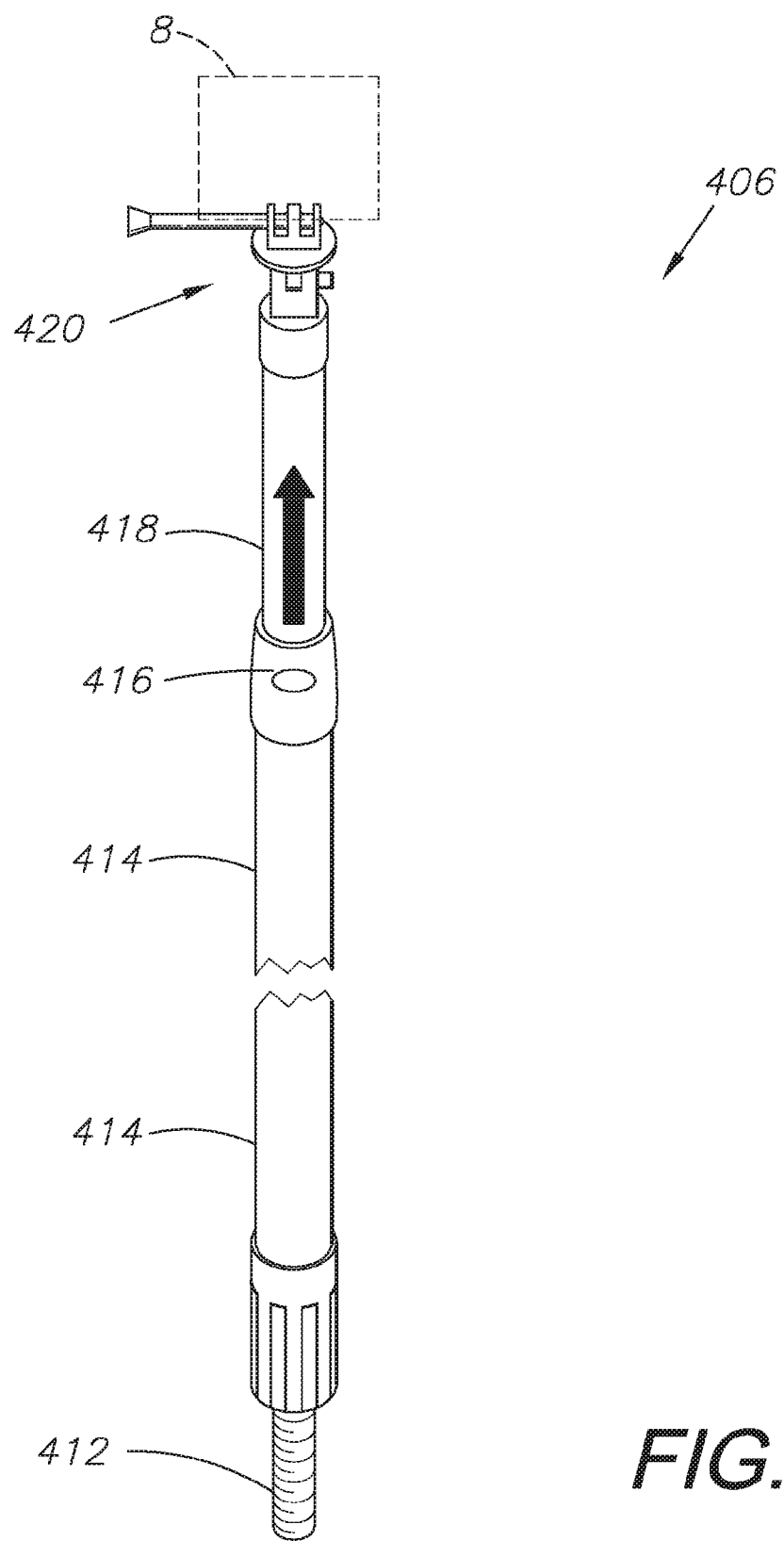
FIG. 19 is an isometric view from the top of the alternative embodiment thereof.

FIG. 13 shows a typical camera housing accessory 308 which would be used to house cameras, such as those disclosed above. The camera housing accessory 308 is designed to mount to the mounting screw 372 of the wireless power delivery system 368. A receiver strip 374 connects to the camera or other electrical accessory via a cord 376 and interface 378. FIG. 14 shows how the camera housing accessory 308 mounts to the base 370 of the wireless power delivery system. In a preferred embodiment the camera housing accessory 308 would be waterproof.

The wireless power delivery system 368 draws power from the battery source 362 of the monopod 356 as shown in FIG. 15A. The delivery system 368 delivers wireless power 380 in a limited range about the base 370, typically less than six inches from the base. As shown in FIG. 15B, when the accessory 308 is attached to the delivery system 368, the wireless power 380 is received by the receiver strip 374 and is delivered to the camera or other electrical accessory via the power cord 376 and interface 378. This wireless power then powers the electrical accessory when in use, and passively charges a battery associated with the electrical accessory, if any, when the accessory is not in use. It should be noted that any and all types of electrical accessories mentioned herein or otherwise requiring electrical power could utilize this arrangement of elements.

In an embodiment of this invention, an ergonomic handle may be located just beneath the wireless power delivery system 368, converting the monopod device into a walking or hiking stick.

VIII. Telescoping Monopod Seat-Mount System 402

FIGS. 16-19 show yet another alternative embodiment of the present invention. Here, as in previous embodiments, a telescoping monopod 406 is deployed in a boat 4 and is used to house a portable electronic accessory 8 such as a camera. The base 412 of the monopod 406 screws into or is otherwise inserted into a seat mount 410 within the deck of the boat 4. The base as shown is threaded, but may not necessarily be threaded.

The monopod 406 includes a bottom arm 414 and a top arm 418. The top arm 418 telescopes from within the bottom arm 414 and is released and/or locked via a release switch 416 or other similar feature. A mounting accessory 420 for mounting the portable electronic accessory 8.

The telescoping monopod 406 extends from approximately four feet (4') long to approximately eight feet (8') long or longer. This provide superior angles for filming action on the boat 4 using a camera mounted to the mounting accessory 420 at the top of the telescoping monopod 406.

Figure 20:
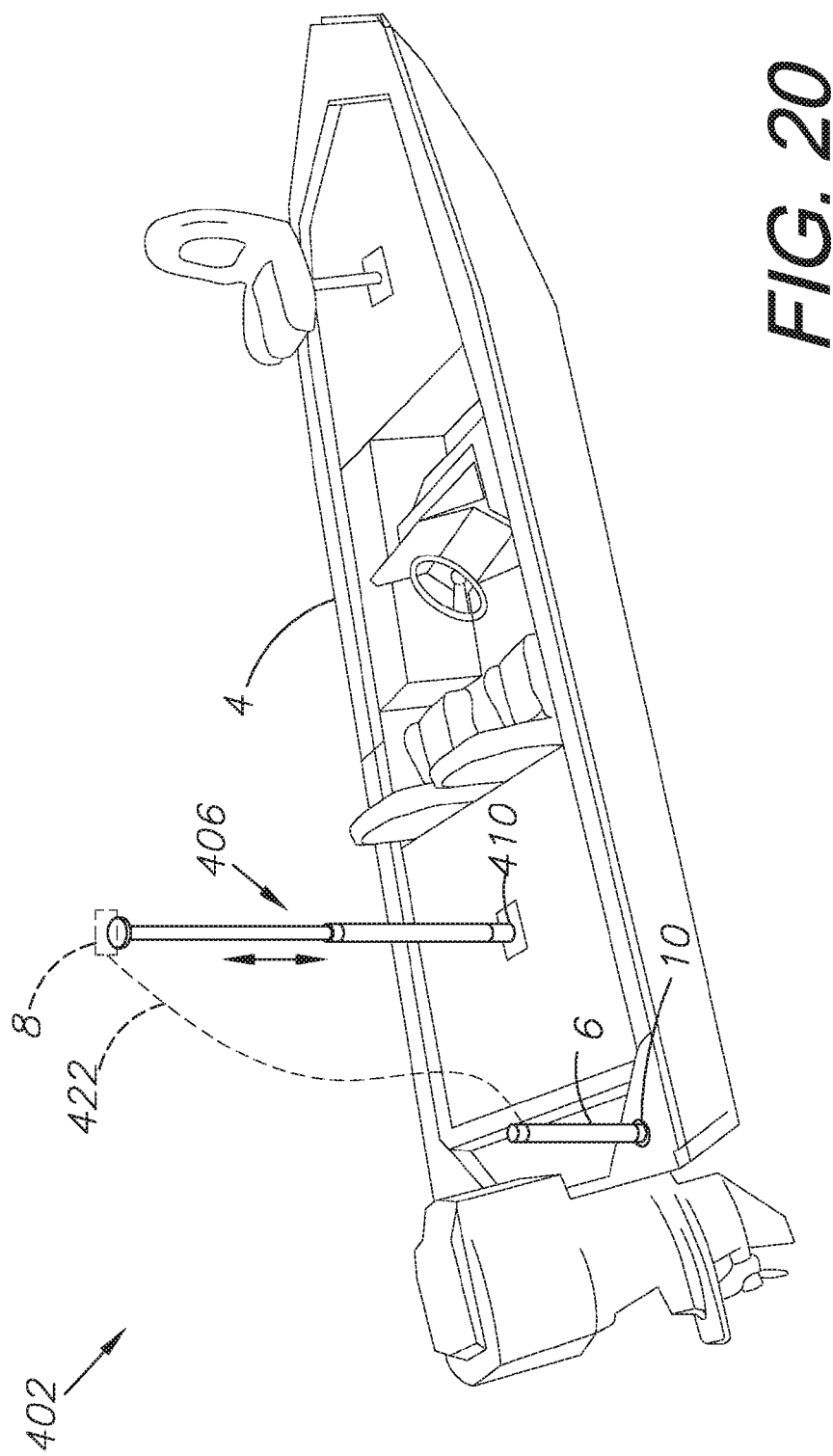
FIG. 20 is an isometric view thereof showing the embodiment interacting with the embodiment shown in FIG. 1.

FIG. 20 shows this embodiment telescoping monopod seat-mount system 402 interacting with the embodiment shown in FIG. 1, thereby providing electrical power for recharging and/or operating the portable electronic accessory 8 via a cord 422.

IX. Monopod Light Source System 502

Figure 21:
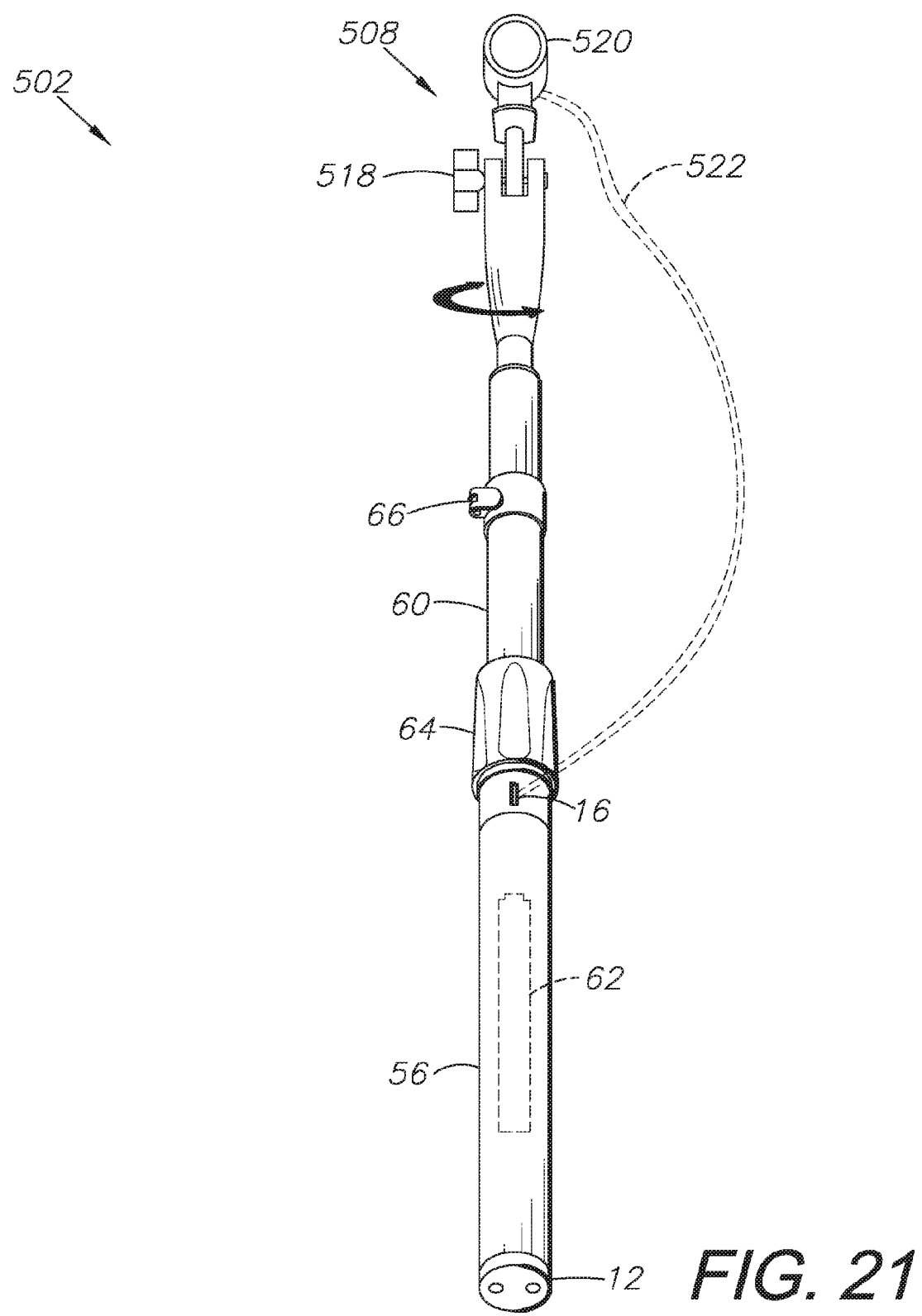
FIG. 21 is an isometric view of an alternative embodiment of the present invention including a light accessory.
Figure 22:
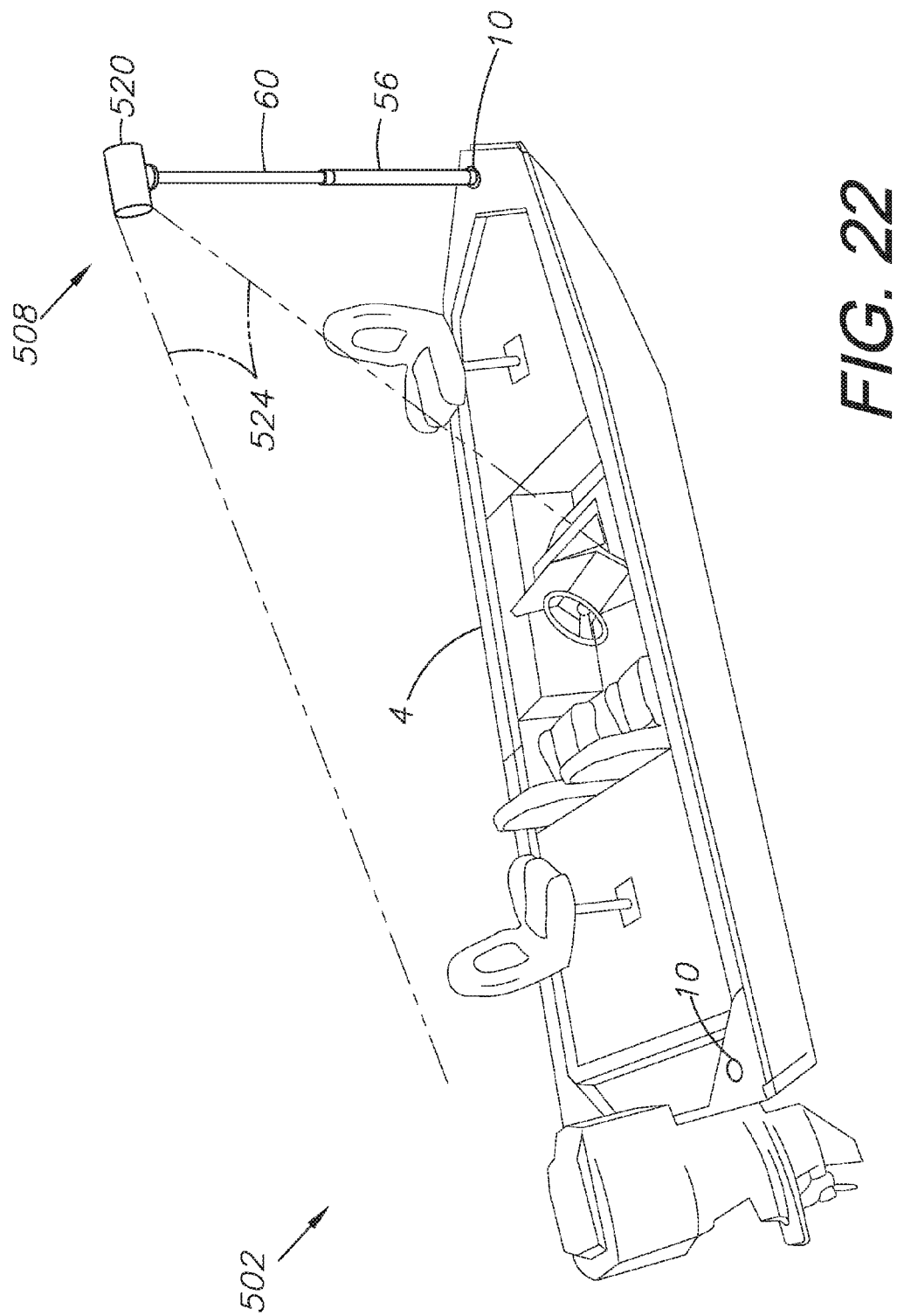
FIG. 22 is an isometric view thereof, showing the embodiment located in a typical environment in which it may be deployed, herein depicted as a bass fishing boat.

FIGS. 21 and 22 show yet another alternative embodiment of the present invention, featuring a telescoping monopod light source 502 which can be used with the embodiments discussed previously or in a stand-alone unit. As shown in FIGS. 21 and 22, the light source system 502 includes a light source accessory assembly 508 used in conjunction with the telescoping monopod of FIG. 5 discussed above.

The light source accessory assembly 508 includes a light source 520 and an adjustable mount 518 which may optionally be locked into a position or unlocked, allowing the light source 520 to be freely turned or pivoted to provide light 524 within a boat 4 or outside of the boat. This is advantageous for providing a spotlight into the boat while operating the boat at night, or for lighting up the waters around the boat. The light source 520 may be plugged into the power source socket 16 via a power cord 522, or may be powered by an internal battery. As shown in FIG. 22, the monopod may provide power to the light source accessory via the navigation light port 10 of the boat 4.

X. Alternative Monopod Light Source System 552

Figure 23:
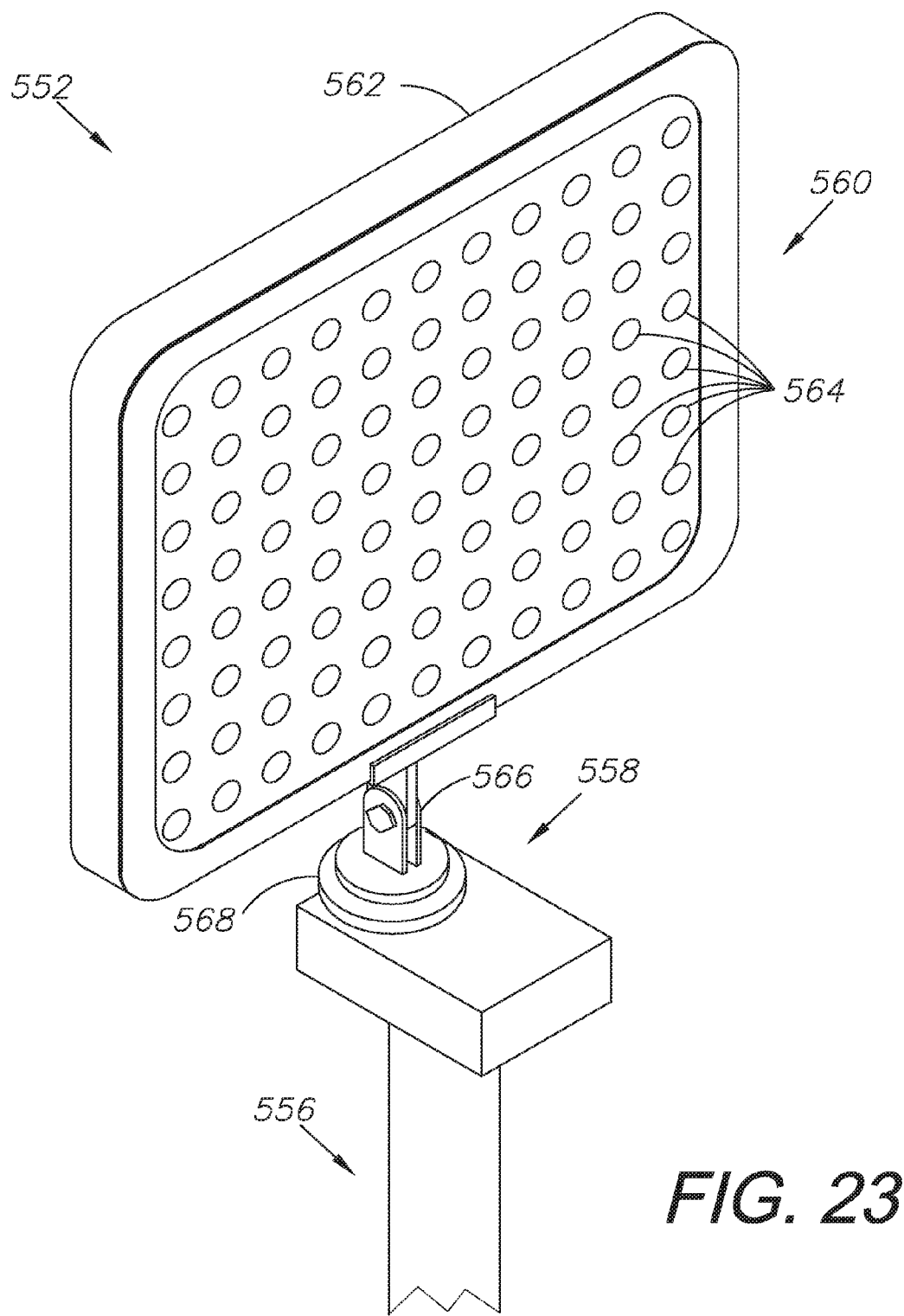
FIG. 23 is a three-dimensional isometric view of another alternative embodiment of the present invention including a light-emitting diode light panel.

As shown in FIG. 23, a slightly alternative monopod light source system 552 employs a flat paneled light source 560 which includes a housing 562 and two faces. One or both faces could include one or more LEDs 564, which can be used to simply provide directional light or could be used to create an LED sign or signal for other boats in the vicinity by lighting up only some of the LEDs.

The housing 562 may be mounted on an accessory mount 558 which includes a pivotable bracket 566 which connected to a rotatable base element 568, allowing the light 560 to pivot up and down and to rotate for a directional light source. The entire mount 558 and light 560 is mounted to a monopod 556, such as those described above. The monopod 556 may be connected to the navigation light port 10 of a boat 4 or into a seat mount 410 within the deck of the boat 4. The light may be controlled by controls located directly on the light 560, such as on the housing 562, or it may be controlled remotely using a portable computing device such as a smartphone.

It is to be understood that while certain embodiments and/or aspects of the invention have been shown and described, the invention is not limited thereto and encompasses various other embodiments and aspects.

Having thus described the invention, What is claimed as new and desired to be secured by Letters Patent is:

1. A monopod for interfacing with the navigation light port of a marine vessel, said monopod comprising:
   a cylindrical elongated body portion having a proximal end and a distal end;
   a base portion located in proximity to the proximal end of said elongated body, said base portion configured to interface with a navigation light port of a marine vessel;
   a tip portion located in proximity to the distal end of said elongated body;
   wherein said monopod is configured to interface with a directional light source;
   said tip portion comprising at least one power port, said power port capable of providing electrical power to said directional light source, and wherein said at least one power port comprises a universal serial bus (USB) port;
   said navigation light port providing said electrical power for said power port;
   said tip portion further comprising an accessory mount configured for receiving and connecting said directional light source; and
   said tip portion configured to position said portable accessory such that a power cable is capable of connecting said at least one power port to a portable accessory.

2. The monopod of claim 1, further comprising:
   a telescoping arm comprising a proximal end and a distal end, said telescoping arm proximal end affixed to said tip portion, and said telescoping arm distal end comprising an interface configured to hold said portable accessory;
   said telescoping arm comprising at least a first arm portion and a second arm portion, wherein said first arm portion is configured to envelop said second arm portion; and
   a locking element configured to lock said second arm portion in a telescoping position relative to said first arm portion.

3. The monopod of claim 2, further comprising:
   a bendable arm pivotally connected to said telescoping arm, said bendable arm comprising at least two arm segments hinged at an elbow; and
   said bendable arm comprising an interface configured to hold a second portable accessory.

4. The monopod of claim 1, further comprising:
   said directional light source comprising a rectangular panel having a housing and two opposing faces;
   at least one of said two opposing faces containing a plurality of light emitting diodes (LEDs); and
   a control for activating at least one of said plurality of LEDs.

5. The monopod of claim 4, further comprising:
   said accessory mount configured to allow said directional light source to tilt upwardly and downwardly; and
   said accessory mount further configured to allow said light source to be rotated about said tip portion.

6. The monopod of claim 1, wherein said directional light source is a spot light.

* * * * *